(12) United States Patent
Farhoodi et al.

(10) Patent No.: US 12,232,028 B2
(45) Date of Patent: Feb. 18, 2025

(54) OPEN RAN RADIO UNIT POWER SAVING ON PER-SYMBOL BASIS

(71) Applicant: Dell Products L.P., Round Rock, TX (US)

(72) Inventors: Ahmad Farhoodi, Kanata (CA); Tommy Ivarsson, Nepean (CA)

(73) Assignee: DELL PRODUCTS, L.P., Round Rock, TX (US)

( * ) Notice: Subject to any disclaimer, the term of this patent is extended or adjusted under 35 U.S.C. 154(b) by 391 days.

(21) Appl. No.: 17/823,643

(22) Filed: Aug. 31, 2022

(65) Prior Publication Data

US 2024/0073815 A1    Feb. 29, 2024

(51) Int. Cl.
*H04L 5/00* (2006.01)
*H04W 52/02* (2009.01)
*H04W 72/04* (2023.01)

(52) U.S. Cl.
CPC ....... *H04W 52/0209* (2013.01); *H04W 72/04* (2013.01)

(58) Field of Classification Search
None
See application file for complete search history.

(56) References Cited

FOREIGN PATENT DOCUMENTS

WO    WO-2022060191 A1 *    3/2022    ........... H04B 7/0413

OTHER PUBLICATIONS

Jeon, Mar. 24, 2022, Device and Method for fronthaul Transmission in wireless Communication System (English), 2022.*
Farhoodi, Ahmad. "Determining Radio Unit DL PRB Scheduling on a Per-Symbol Basis" U.S. Appl. No. 18/352,449, filed Jul. 14, 2023, 50 pages.

* cited by examiner

*Primary Examiner* — Gary Lafontant
(74) *Attorney, Agent, or Firm* — Amin, Turocy & Watson, LLP

(57) ABSTRACT

Parsing of C-plane messages is described, e.g., C-plane messages that are communicated from an open RAN distributed unit (O-DU) to an open RAN radio unit (O-RU) in order to determine whether a particular symbol that is to be subsequently communicated via U-plane messages is blank (e.g., no physical resource blocks (PRB)) or not blank (e.g., at least one PRB). A bitmap can be constructed by the O-RU having a bit length equal to the number of symbols to be communicated, where each bit of the bitmap corresponds to one of the symbols. Values of each bit of the bitmap can indicate whether a corresponding symbol is blank or not blank, and, if blank, some devices can be powered down to conserve power on a symbol-by-symbol basis in a manner that is compliant with Open RAN specifications and does not presume the same vendor for O-RU and O-DU.

20 Claims, 11 Drawing Sheets

EXAMPLE DISAGGREGATED OPEN RAN (O-RAN)

EXAMPLE BITMAP 304 FOR 1 SLOT WITH NORMAL CYCLIC PREFIX — 400A

| BITMAP 304 | 0 | 1 | 0 | 0 | 0 | 1 | 0 | 1 | 0 | 0 | 1 | 0 | 1 | 0 |
|---|---|---|---|---|---|---|---|---|---|---|---|---|---|---|
| SYMBOL # | 1 | 2 | 3 | 4 | 5 | 6 | 7 | 8 | 9 | 10 | 11 | 12 | 13 | 14 |

FIG. 4A

EXAMPLE BITMAP 304 FOR 1 SLOT WITH EXTENDED CYCLIC PREFIX — 400B

| BITMAP 304 | 0 | 1 | 0 | 0 | 0 | 1 | 0 | 1 | 0 | 0 | 1 | 0 |
|---|---|---|---|---|---|---|---|---|---|---|---|---|
| SYMBOL # | 1 | 2 | 3 | 4 | 5 | 6 | 7 | 8 | 9 | 10 | 11 | 12 |

FIG. 4B

| LEGEND | |
|---|---|
| BIT VALUE | DESCRIPTION |
| 0 | CORRESPONDING SYMBOL HAS AT LEAST 1 PRB |
| 1 | CORRESPONDING SYMBOL HAS NO PRBs |

| | 0 (msb) | 1 | 2 | 3 | 4 | 5 | 6 | 7 (lsb) | # of bytes | |
|---|---|---|---|---|---|---|---|---|---|---|
| | \multicolumn{8}{c|}{Section Type 1: DL/UL control msgs} | | |
| | \multicolumn{8}{c|}{transport header, see section 3.1.3} | 8 | Octet 1 ... Octet 8 |
| | dataDirection | \multicolumn{7}{c|}{payloadVersion ... filterIndex} | 1 | Octet 9 |
| | \multicolumn{8}{c|}{frameId} | 1 | Octet 10 |
| | \multicolumn{4}{c|}{subframeId} | \multicolumn{4}{c|}{slotId} | 1 | Octet 11 |
| | slotId | \multicolumn{7}{c|}{startSymbolId} | 1 | Octet 12 |
| | \multicolumn{8}{c|}{numberOfSections} | 1 | Octet 13 |
| | \multicolumn{8}{c|}{sectionType = 1} | 1 | Octet 14 |
| | \multicolumn{8}{c|}{udCompHdr} | 1 | Octet 15 |
| | \multicolumn{8}{c|}{reserved} | 1 | Octet 16 |
| | \multicolumn{8}{c|}{sectionId} | 1 | Octet 17 |
| | sectionId | \multicolumn{3}{c|}{rb} | \multicolumn{2}{c|}{symInc} | \multicolumn{2}{c|}{startPrbc} | 1 | Octet 18 |
| | \multicolumn{8}{c|}{startPrbc} | 1 | Octet 19 |
| | \multicolumn{8}{c|}{numPrbc} | 1 | Octet 20 |
| | \multicolumn{8}{c|}{reMask[11:4]} | 1 | Octet 21 |
| | \multicolumn{4}{c|}{reMask[3:0]} | \multicolumn{4}{c|}{numSymbol} | 1 | Octet 22 |
| | \multicolumn{8}{c|}{beamId[14:8]} | 1 | Octet 23 |
| | \multicolumn{8}{c|}{beamId[7:0]} | 1 | Octet 24 |
| | ef | \multicolumn{7}{c|}{section extensions as indicated by "ef"} | var | Octet 25 |

| | 0 (msb) | 1 | 2 | 3 | 4 | 5 | 6 | 7 (lsb) | # of bytes | |
|---|---|---|---|---|---|---|---|---|---|---|
| colspan="9" | Section Type 3: PRACH & mixed-numerology | | 8 | Octet 1 |
| dataDirection | | payloadVersion | | | filterIndex | | | | 1 | Octet 9 |
| | | | frameId | | | | | | 1 | Octet 10 |
| subframeId | | | | startSymbolid | | | | | 1 | Octet 11 |
| slotId | | | | | | | | | 1 | Octet 12 |
| colspan="8" | numberOfSections | | 1 | Octet 13 |
| colspan="8" | sectionType = 3 | | 1 | Octet 14 |
| colspan="8" | timeOffset | | 2 | Octet 15 |
| frameStructure | | | | | | | | | 1 | Octet 17 |
| colspan="8" | cpLength | | 2 | Octet 18 |
| colspan="8" | udCompHdr | | 1 | Octet 20 |
| colspan="8" | sectionId | | 1 | Octet 21 |
| | | sectionId | | | rb | | symInc | startPrbc | 1 | Octet 22 |
| startPrbc | | | | | | | | | 1 | Octet 23 |
| colspan="8" | numPrbc | | 1 | Octet 24 |
| colspan="8" | reMask[11:4] | | 1 | Octet 25 |
| reMask[3:0] | | | | | | numSymbol | | | 1 | Octet 26 |
| colspan="8" | beamId[14:8] | | 1 | Octet 27 |
| colspan="8" | beamId[7:0] | | 1 | Octet 28 |
| colspan="8" | freqOffset | | 3 | Octet 29 |
| colspan="8" | reserved (8 bits) | | 1 | Octet 32 |
| ef | | | | | | | | | 1 | Octet 33 |
| colspan="8" | section extensions as indicated by 'ef' | | var | |

FIG. 7

OPEN RAN RADIO UNIT POWER SAVING ON PER-SYMBOL BASIS

BACKGROUND

The O-RAN Alliance defines the specifications for all Open RAN components and the interfaces between them. Founded in 2018, the O-RAN Alliance is a progressive, global community comprising mobile network operators, manufacturers, vendors, and research and academic organizations working in telecommunications spaces all over the world. Typically, Open RAN refers to the disaggregated radio access network with open interfaces between network components sourced from multiple suppliers.

Open RAN (also referred to as O-RAN) represents an ongoing shift in mobile network architectures that enables service providers the use of non-proprietary subcomponents from a variety of vendors. An Open RAN, or open radio access network, is made possible by a set of industry-wide standards that telecom suppliers can follow when producing related equipment. Open RAN enables programmable, intelligent, disaggregated, virtualized, and interoperable functions. Specifically, the proprietary remote radio head (RRH) and baseband units (BBUs) are now disaggregated to radio units (RUs), distributed units (DUs), and centralized units (CUs), many of which can be virtualized or containerized. The interfaces between these new components are open and interoperable. Hence, a service provider is not locked in to a single proprietary vendor for any given component, and all vendor-supplied components that are O-RAN compliant are able to communicate with any other O-RAN compliant component, regardless of the particular vendor.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which:

FIG. 4A depicts an example diagram illustrating a first example of the bitmap for one slot with normal cyclic prefix in accordance with example embodiments of this disclosure;

FIG. 4B depicts an example diagram illustrating a second example of the bitmap for one slot with extended cyclic prefix in accordance with example embodiments of this disclosure;

FIG. 6 illustrates an example diagram describing a structure of section type 1 messages in accordance with example embodiments of this disclosure;

FIG. 7 illustrates an example diagram describing a structure of section type 3 messages in accordance with example embodiments of this disclosure;

DETAILED DESCRIPTION

Overview

Figure 1:
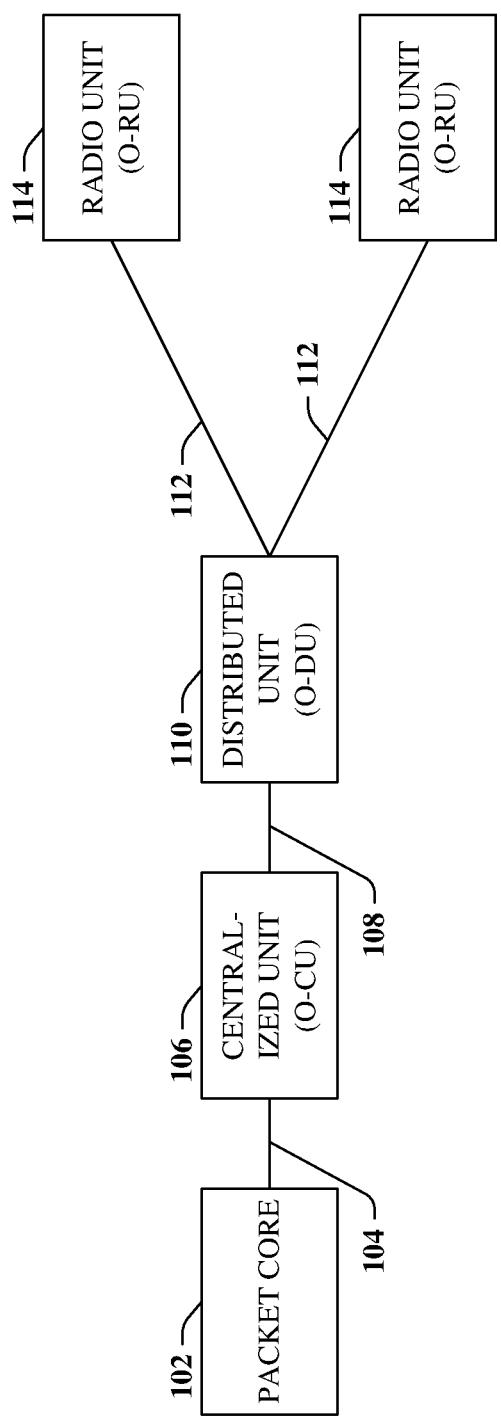
FIG. 1 illustrates a schematic block diagram illustrating an example disaggregated Open RAN in accordance with example embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

The present application relates generally to identifying power saving opportunities on a symbol-by-symbol basis and, more particularly, to identifying those opportunities in the context of an Open RAN (radio access network) radio unit (O-RU).

In order to better understand the subject matter detailed herein, it can be instructive to consider an example Open RAN architecture. FIG. 1 depicts a schematic block diagram 100 that illustrates an example disaggregated Open RAN in accordance with some example embodiments of this disclosure. In this example, the Open RAN network comprises packet core 102 configured to communicate via backhaul 104 with one or more centralized unit (O-CU) 106. Typically, backhaul 104 transports data according to Internet protocol (IP).

O-CU 106 can communicate via open midhaul interface 108 with one or more distributed unit (O-DU) 110. Open midhaul interface 108 can communicate according to IP, but it is noted that because open midhaul interface 108 is an open standard, it is no longer expected that equipment comprising O-CU 106 and O-DU 110 communicate in a proprietary way or be from the same vendor.

In some embodiments, packet core 102, O-CU 106, or O-DU 110 can be virtualized and operate, respectively, as a virtual packet core 102, a virtual centralized unit (vCU) 106, or a virtual distributed unit (vDU) 110.

O-DU 110 can communicate via open fronthaul interface 112 with one or more radio unit (O-RU) 114. Open fronthaul interface 112 can communicate according to an enhanced common public radio interface (eCPRI) protocol or a radio-over-Ethernet (ROE) protocol.

It is noted that until Open RAN, the interfaces between conventional BBU and RRH were proprietary, meaning that only one vendor could provide both BBU and RRH equipment. Open RAN disaggregated this architecture and introduced open interfaces (e.g., open midhaul interface 108, open fronthaul interface 112, . . . ). Moreover, instead of relying on conventional RRH and BBU architectures, associated functions are disaggregated into elements depicted herein, namely, the radio unit (e.g., O-RU 114), the distributed unit (e.g., O-DU 110), and the centralized unit (e.g., 0-CU 106) with open interfaces between them and with the potential that radio unit, distributed unit, or centralized unit functions can be virtualized or containerized.

One challenge that confronts modern networks, including Open RANs, is power consumption, particularly in radio units such as O-RU 114. Because open fronthaul interface 112 operates according to an open standard, O-DU 110 and O-RU 114 can be from different vendors. While this represents a significant benefit to service providers, such also means that any interaction between O-DU 110 and O-RU 114 that is not part of the O-RAN specification cannot be presumed. Therefore, certain proprietary techniques relied upon to reduce power consumption and/or extend battery life for a given radio unit may not be suitable for deployment in an Open RAN implementation, particularly techniques that relied upon computations performed upstream from the radio unit or extra commands or signals, since that particular component might be a different vendor that is not programmed to perform those computations or perform the computations in the same way or not programmed to send the extra commands or signals.

To these and other related ends, the disclosed subject matter can identify power saving opportunities for O-RU 114. These power saving opportunities can be identified by the O-RU 114 itself without relying on any computations or intelligence assumed from another component of the Open RAN (e.g., O-DU 110, O-CU 106, . . . ), but rather relying (potentially entirely) on information that is available to O-RU 114 as part of ordinary Open RAN operation.

In particular, techniques detailed herein can enable an O-RU to save power or increase energy efficiency on a symbol-by-symbol basis. For example, techniques detailed herein can operate to identify orthogonal frequency division multiplexing (OFDM) symbols that have no data allocated to be transmitted or to be received over the air, which are referred to herein as blank symbols.

By identifying blank symbols within a given transmission of data, some devices of O-RU 114 relating to transmitting, receiving, processing, and so forth can be powered down for any time that coincides with a blank symbol instead of remaining in a power-consuming state. Such operation, even for time periods as short as a single symbol, can result in significant power consumption reduction by an associated O-RU 114. Advantageously, said power saving opportunities can be identified by O-RU 114 for any communication over open fronthaul interface 112 that is Open RAN-compliant, regardless of whether or not O-RU 114 and O-DU 110 are from the same vendor.

Figure 2:
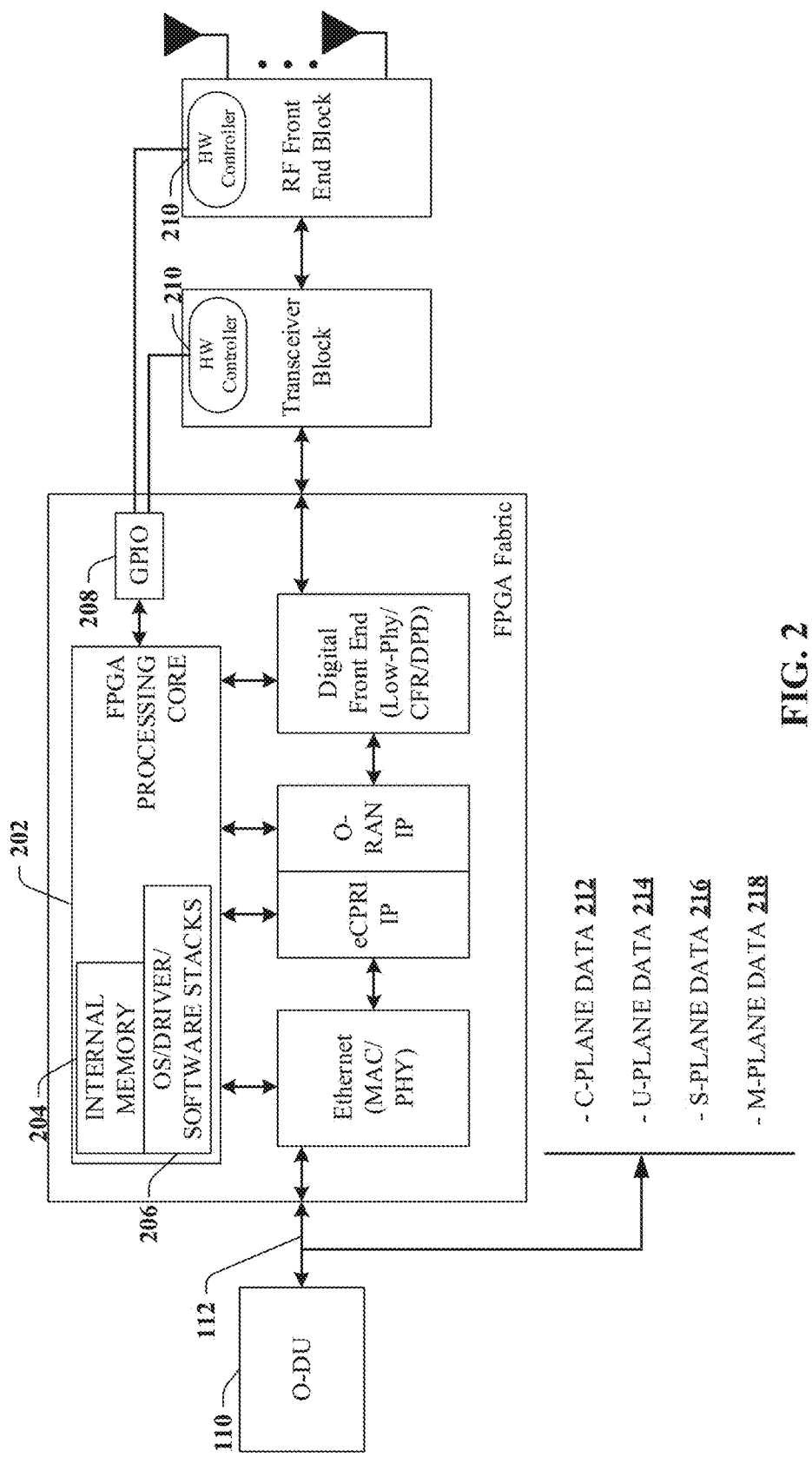
FIG. 2 depicts a schematic block diagram illustrating an example field programmable gate array (FPGA) O-RU architecture in accordance with example embodiments of this disclosure.

FIG. 2 depicts a schematic block diagram 200 that illustrates an example O-RU 114 architecture in accordance with some example embodiments of this disclosure. It is appreciated that O-RU 114 can be any suitable device or circuit that is capable of being Open RAN compliant. Non-limiting examples include a field programmable gate array (FPGA) device, an application-specific integrated circuit (ASIC), a microcontroller and so. In this particular example, O-RU 114 is implemented as a FPGA, though it is understood such is not intended to be limiting, but rather to provide one concrete example in the context of the disclosed subject matter.

O-RU 114 can be configured to communicate, for example, via open fronthaul interface 112, with O-DU 110, which can be any suitable distributed unit that is Open RAN-compliant. Open RAN specifications define four different communication planes over open fronthaul interface 112, namely a control plane (C-plane), a user plane (U-plane), a synchronization plane (S-plane), and a management plane (M-plane). The control plane is used for communication of C-plane data 212, which is generally related to control plane messages that define the scheduling and coordination utilized for data transfer, beam forming, or the like. The user plane is used for communication of U-plane data 214, which is generally related to user plane message for efficient data transfer within the strict time limits of related communication specifications such as 5G numerologies. The synchronization plane is used for communication of S-plane data 216, which is generally responsible for timing and synchronization parameters between the O-DU 110 and the O-RU 114. The management plane is used for communication of M-plane data 218, which is used to manage the O-RU 114.

O-RU 114 can comprise a processor and a memory, in this case respectively illustrated as FPGA processing core 202 and internal memory 204. Internal memory 204 can comprise data 206 relating to operating system data, driver data, software stack data, and so forth. As noted previously, an objective of the disclosed techniques is to identify blank symbols. Information relating to blank symbols (e.g., in the form of bitmaps detailed subsequently) can be generated by FPGA processing core 202 and potentially stored to internal memory 204. Based on these bitmaps (or other suitable identification of blank or non-blank symbols), various devices can be instructed to power down during a time corresponding to the blank symbols and/or power back up for non-blank symbols. Such can be effectuated via general purpose input/output (GPIO) 208 that facilitates instructions to, e.g., a hardware controller 210 to power down/up associated devices or equipment according to the bitmap.

Open RAN-compliant devices typically communicate via OFDM protocols or techniques in which OFDM symbols are communicated between the two devices, generally via U-plane data 214. However, prior to such communication, PRBs can be scheduled or allocated to a given symbol via C-plane data 212 that is required by Open RAN specification for processing of U-plane data 214.

Techniques detailed herein can utilize existing control plane message (e.g., C-plane data 212) sent from O-DU 110 to O-RU 114 over open fronthaul interface 112. Such C-plane data 212 can be examined to identify OFDM symbols for each slot, subframe, radio frame, and antenna for both downlink and uplink directions that are blank and therefore carry no information (e.g., no PRBs are allocated or scheduled to be transmitted or received over those symbols over the air). In other words, individual bitmaps can be constructed for uplink traffic and downlink traffic as well as for each separate antenna of O-RU 114. The individual bitmaps can be constructed for any duration, including for one or more slots, one or more subframes, one or more radio frames and so forth. Bitmaps related to different slots (or other duration) can be combined with other bitmaps to form a longer duration (e.g., several slot bitmaps can be combined to form a subframe bitmap). Implementation of such can be based on available storage space of internal memory 204.

The disclosed techniques can detect blank symbols among symbols scheduled by O-DU 110 either dynamically in each time slot (or other duration) via C-plane messages or statically allocated for channels such as physical random access channel (PRACH) and a sounding reference signal (SRS) channel.

Thus, blank symbols can be detected in resource block allocations for all physical downlink channels, including but not limited to: a physical downlink shared channel (PDSCH), a physical downlink control channel (PDCCH), demodulated reference signal (DMRS) PDSCH, phase tracking reference signal (PTRS)-PDSCH, DMRS-PDCCH, DRMS-physical broadcast channel (PBCH), channel state information reference signal (CSI-RS), primary synchronization signals (PSS), secondary synchronization signals (SSS), or synchronization signal (SS) block; and all physical uplink channels, including but not limited to: physical uplink shared channel (PUSCH), physical uplink control channel (PUCCH), PRACH, DMRS-PUSCH, PTRS-PUSCH, DMRS-PUCCH, or SRS.

Example Blank Symbol Detection Systems

Figure 3:
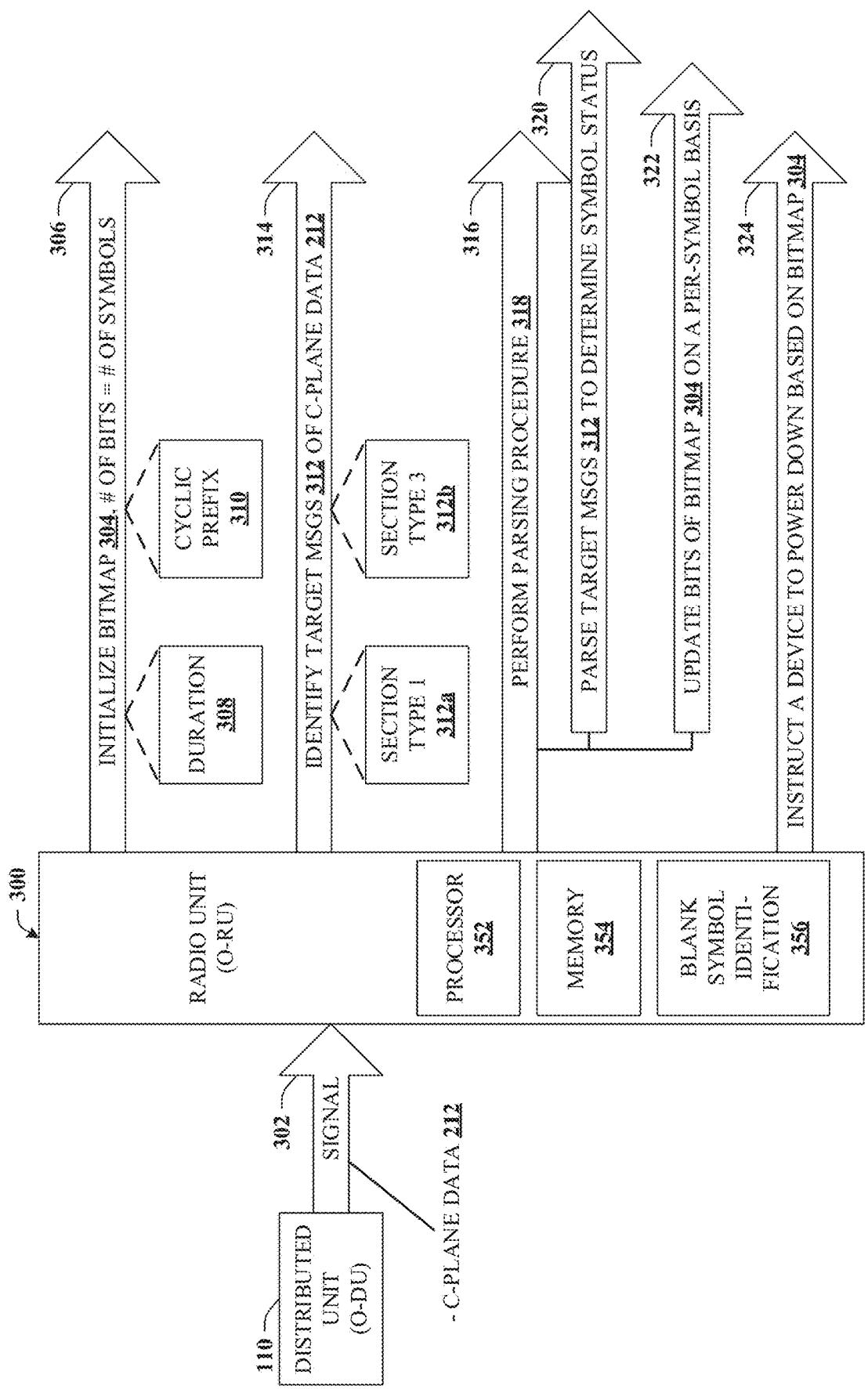
FIG. 3 depicts a schematic block diagram illustrating an example O-RU that can determine blank and/or non-blank symbols that are scheduled or allocated in accordance with example embodiments of this disclosure.

Referring now to FIG. 3, a schematic block diagram is depicted illustrating an example O-RU 300 that can determine blank and/or non-blank symbols that are scheduled or allocated in accordance with some example embodiments of this disclosure. A 'blank' symbol can be a symbol in which no physical resource block (PRB) is allocated or scheduled. Conversely, a 'non-blank' symbol can be a symbol in which at least one PRB is allocated or scheduled. Device 300 can comprise a processor 352 that can be specifically configured to identify blank or non-blank symbols in accordance with blank/non-blank identification procedure 356. Device 300 can also comprise memory 354 that stores executable instructions that, when executed by processor 352, can facilitate performance of operations. Processor 352 can be a hardware processor having structural elements known to exist in connection with processing units or circuits, with various operations of processor 352 being represented by functional elements shown in the drawings herein that can require special-purpose instructions, for example, stored in memory 354 and/or a blank/non-blank identification procedure 356 component or circuit. Along with these special-purpose instructions, processor 352 and/or device 300 can be a special-purpose device. One non-limiting example of processor 352 and memory 354 can be FPGA processing core 202 and internal memory 204 of FIG. 2. Further examples of memory 354 and processor 352 can be found with reference to FIG. 11. It is to be appreciated that device 300 or computer 1102 can represent a network device, a client device, or other device that can be used in connection with implementing one or more of the systems, devices, or components shown and described in connection with FIG. 3 and other figures disclosed herein.

Initially, it is noted that physical resource blocks (PRBs) can be allocated or scheduled statically (e.g., via M-plane data 218) or dynamically (e.g., via C-plane data 212). While much of this disclosure focuses on dynamically allocated or scheduled PRBs, it is understood that statically allocated or scheduled PRBs can be accounted for, an example of which is discussed in connection with FIG. 8.

O-RU 300 can be configured to receive signal 302. Signal 302 can be formatted according to an open radio access network (Open RAN) standard or specification. Signal 302 can comprise at least C-plane data 212.

In the context of dynamically allocated or scheduled PRBs, it is noted that each OFDM symbol can consist of several PRBs depending on the channel bandwidth and subcarrier spacing that is employed. For example, an OFDM symbol with 100 megaHertz (MHz) of bandwidth and subcarriers spacing of 30 kiloHertz (kHz) has 273 PRBs in total.

The full PRB allocation scheme for a particular symbol can depend on a number of parameters, including, for example, how O-DU 110 schedules different users by assigning different time and frequency resources to each user (e.g., each 0-RU 114 that is served by O-DU 110). Another example parameter can be the location of control and reference signals in a time-frequency grid.

C-plane data 212 generally carry data-associated control information from O-DU 110 to O-RU 114, which is required for subsequently processing U-plane data at O-RU 114. This data-associated control information can include, e.g., scheduling and PRB allocations in both downlink and uplink communications.

However, C-plane message granularity is not necessarily based on a symbol-by-symbol definition. Rather, the information utilized to identify different resource elements inside a particular PRB to construct an associated OFDM symbol can be described by different sections of a given C-plane message, as well as by many different C-plane messages. In other words, C-plane messages can describe PRB allocations for many different symbols that are scattered all over the time-frequency grid over the duration of a slot (or other duration).

Hence, in order to identify blank symbols O-RU 114 can determine a location of fully blank symbols (or, conversely non-blank symbols) on a symbol-by-symbol basis, which is not a trivial determination, due at least in part to the arrangement of PRB allocations within typical C-plane messages.

In that regard, O-RU 114 can initialize bitmap 304. Bitmap 304 can comprise a number of bits (e.g., length or bit length) corresponding to a number of symbols that are allocated or scheduled, via the Open RAN, for transport between O-DU 110 and O-RU 114, as illustrated in connection with reference numeral 306. Hence, the actual number of bits of bitmap 304, as with the number of symbols, can depend on numerous factors, such as duration 308 and cyclic prefix 310. Duration 308, in this context, refers to an amount of time of a time-frequency grid or the like such as, e.g., a slot, subframe (e.g., composed of one or more slots), radio frame (e.g., composed of one or more subframes), or the like.

While still referring to FIG. 3, but turning now as well to FIGS. 4A and 4B, two example bitmaps 304 are depicted. In that regard, diagram 400A illustrates a first example bitmap 304 for one slot with normal cyclic prefix in accordance with some example embodiments of this disclosure. Diagram 400B illustrates a second example of bitmap 304 for one slot with extended cyclic prefix in accordance with some example embodiments of this disclosure. Since each bit of bitmap 304 can indicate whether a corresponding symbol is blank, the number of bits in bitmap 304 can match the number of symbols. Thus, for a single slot with normal cyclic prefix, 14 symbols can be transported. As such, bitmap 304 can be generated or initialized in that case with 14 bits, as illustrated by diagram 400A. In contrast, for a single slot with extended cyclic prefix, 12 symbols can be transported. Hence, bitmap 304, in that case can be generated or initialized with 12 bits, as illustrated by diagram 400B.

While both of these examples relate to a single slot, other durations 308 are possible. For example, if a subframe comprises two slots, then bitmap 304 for that subframe (as opposed to a single slot) can have a length of 28 bits in the case of normal cyclic prefix or 24 bits in the case of extended cyclic prefix.

If a given bit is set to a first value, such can indicate that a corresponding symbol has at least one PRB described by C-plane messages. As illustrated in the legend, in this example, the first value is "0". If a given bit is set to a second value, such can indicate that a corresponding symbol has no PRBs described by C-plane messages. As illustrated in the legend, in this example, the second value is "1". It is appreciated that in other embodiments, the first value could instead be indicated by "1" while the second value is indicated by "0".

It is appreciated that a distinct bitmap 304 can be created for uplink scheduling and downlink scheduling for each antenna of O-RU 300, wherein each distinct bitmap can relate to a variety of durations 308. For instance, a first bitmap 304 can be created for uplink traffic over antenna A for a given slot, a second bitmap 304 created for downlink traffic over antenna A for the given slot, a third bitmap 304 created for uplink traffic over antenna B for the given slot, and a fourth bitmap 304 created for downlink traffic over antenna B for the given slot. Any of said bitmaps 304 can cover any suitable duration 308 (e.g., expanded or appended to other bitmaps to yield a subframe bitmap 304, a frame bitmap 304, and so on).

Still referring to FIG. 3, once bitmap 304 is initialized having a length or number of bits corresponding to the number of symbols to be transported over a given duration 308 (e.g., slot, subframe, radio frame, . . . ), a given bitmap 304 can be used to identify which symbols scheduled for transport (e.g., via subsequent U-plane data 214) are empty (or, conversely, not empty) by setting each bit appropriately to either the first value or the second value. In order to determine which symbols scheduled for transport are empty or not empty, O-RU 300 can examine C-plane data 212.

Figure 5A:
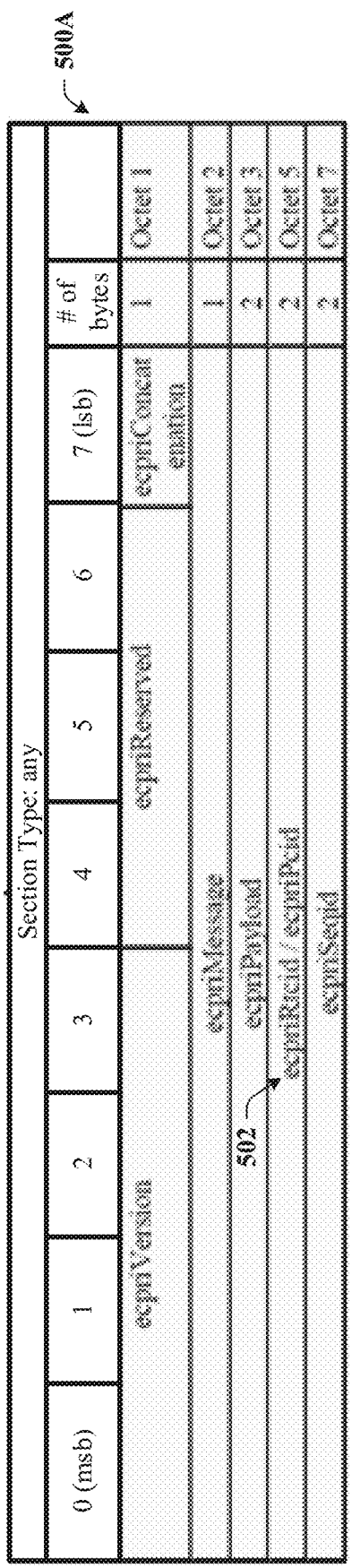
FIG. 5A depicts an example diagram illustrating an example transport header format structure in accordance with example embodiments of this disclosure.

C-plane data 212 can comprise many C-plane messages that use a common frame format consisting of a transport layer and an application layer. FIG. 5A depicts diagram 500A illustrating an example transport header format structure in accordance with some example embodiments of this disclosure. It is appreciated that Open RAN supports multiple different transport headers within the Ethernet payload to further describe how the application data is to be handled in the C-plane and U-plane. The provided example relates to an eCPRI transport header format, but it is appreciated that other types of transport header formats are known. The transport header is eight bytes in length and provides numerous basic data routing capabilities. For example, these data routing capabilities can comprise: description of the data flow type, sending and receiving port identifiers, an ability to support concatenation, sequence numbering, or the like.

Figure 5B:
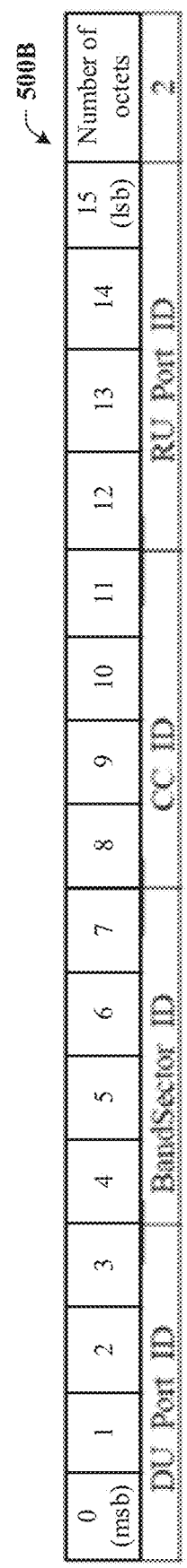
FIG. 5B depicts an example diagram illustrating an example bit allocation for an eAxC identifier in accordance with example embodiments of this disclosure.

It is noted that the ecpriRtcid/ecpriPcid parameter (e.g., octets 5 and 6, illustrated at reference numeral 502, is an eAxC identifier (e.g., eAxC ID) and identifies the specific data flow associated with each C-plane (e.g., ecpriRtcid) or U-plane (e.g., ecpriPcid) message. A given eAxC identifier (e.g., eAxC ID) comprises several ID fields. These ID fields can include a Distributed Unit identifier (e.g., DU_Port_ID), a band and sector identifier (e.g., BandSector_ID), a component-carrier identifier (e.g., CC_ID), and a spatial stream identifier (e.g., RU_Port_ID). The bitwidth of each of the above fields is variable and set via M-plane data 218. FIG. 5B depicts diagram 500B illustrating an example bit allocation for an eAxC identifier in accordance with some example embodiments of this disclosure.

As noted above, a C-plane messages using a common frame format can consist of a transport layer and an application layer. The application layer consists of a common header followed by parameters specific to a C-plane section type that is being used. A 'section type' defines the characteristics of U-plane data to be transmitted or received from a beam with one pattern ID within the application common header. According to Open RAN specifications, there are currently several section types being used, out of a possible 256 section types that can be supported.

However, based on current implementations, only two section types are (currently) relevant to the techniques disclosed herein, namely, C-plane messages of section type 1 or C-plane messages of section type 3. Messages of section type 1 are used for downlink and uplink radio channels. FIG. 6 illustrates diagram 600 describing a structure of section type 1 messages in accordance with some example embodiments of this disclosure. Messages of section type 3 are used for PRACH and mixed-numerology channels. FIG. 7 illustrates diagram 700 describing a structure of section type 3 messages in accordance with some example embodiments of this disclosure.

Still referring to FIG. 3, the above section types (e.g., section type 1 and section type 3) are mandatory section types in C-plane messages and are required to be supported by any Open RAN compliant O-DU 110. Such indicates that, while static scheduling is handled in other ways, all dynamic scheduling and PRB allocation information is communicated to O-RU 300 in C-plane messages via these two section types from O-DU 110.

Hence, in order to determine which scheduled symbols are in fact blank, one can, in some embodiments, limit examination of C-plane messages to examining only a subset of C-plane messages comprising only those C-plane messages that are of section type 1 or section type 3. This subset is referred to herein as target messages 312, which can be identified by O-RU 300, as illustrated at reference numeral 314. In other words, target messages 312 can consist of only messages of section type 1 (e.g., target message type 312a) or messages of section type 3 (e.g., target message type 312b) and exclude other messages, e.g., messages of section types 4-7 or the like. Furthermore, it is appreciated that techniques detailed herein can be implemented in a similar manner to process messages of section type 5 instead of or in addition to section types 1 or 3.

However, it is understood that future changes to Open RAN specifications such as the introduction of additional section types, can result in changes to the current implementation. For example, future changes to Open RAN specifications may result in interest in other section types, other than section type 1 and section type 3, without departing from the scope or spirit of the disclosed techniques. Therefore, in some embodiments, target messages 312 can include other section types in addition to, or instead of, section types 1 or 3.

As illustrated at reference numeral 316, O-RU 300 can perform parsing procedure 318. Parsing procedure 318 can parse all or a subset of messages included in C-plane data 212, which is further detailed according to some embodiments in connection with FIG. 8. In some embodiments, as illustrated here at reference numeral 320, parsing procedure 318 can parse only target messages 312 (e.g., only C-plane message of section type 1 or section type 3) to determine a symbol status (e.g., blank or not blank) of a given symbol.

In other words, parsing procedure 318 can determine whether a given symbol allocates or schedules a PRB.

At reference numeral 322, parsing procedure 318 can comprise updating bits of bitmap 304 on a per-symbol basis. For instance, if the symbol status of the given symbol is blank (e.g., does not allocate any PRB) then an associated bit of bitmap 304 can be set to the first value (e.g., "1"). On the other hand, if the symbol status of the given symbol is not blank (e.g., allocates at least one PRB) then an associated bit of bitmap 304 can be set to the second value (e.g., "0"). In some embodiments, bitmap 304 can be stored to memory 354 for subsequent access or recall such as in connection with subsequent processing of U-plane data 214.

At reference numeral 324, O-RU 300 can instruct a device or circuit to power down during communication of any symbol in which a corresponding bit of bitmap 304 is set to the first value. It is understood that in a typical O-RU 300, most of the power is consumed at the radio frequency (RF) and analog signal processing blocks, such as high-power amplifiers (HPA) (e.g., in the downlink path) and low noise amplifiers (LNA) (e.g., in the uplink path) and data converters such as analog to digital converters (ADC) or digital to analog converters (DAC). Hence, shutting down transceiver chains during time periods in which there is no data scheduled to be transmitted or received can significantly impact total consumed power in O-RU 300 and substantially improve the overall energy efficiency.

It is to be appreciated that, in some embodiments, parsing procedure 318 can operate by internally tracking symbol identifiers within the target messages 312 and section identifiers within a given message, which is explained in greater detail with reference to FIG. 8. For example, in some embodiments, parsing procedure 318 can determine whether a given symbol allocates or schedules the physical resource block in response to processing each section of a message by successively decrementing a number of sections field (e.g., numOfSections) until all sections of the target message are processed.

Similarly, parsing procedure 318 can determine whether a given symbol allocates or schedules a physical resource block in response to processing each message by successively decrementing a symbol number field (e.g., numSymbol) until all symbols have been processed, while tracking a current symbol parameter that is incremented in response to an increment symbol field (e.g., symInc) being set to 1.

Further, in some embodiments, when bitmap 304 is initialized or created (e.g., reference numeral 306), all (or a portion of) the bits can be set to an initial value, such as the first value (e.g., "1") or the second value (e.g., "0"). In that case, it is only necessary to update those bits that are determined to have a different symbol status (e.g., blank vs not blank). While the initial setting can be either the first value or the second value, it can be advantageous to initially set all bits to the first value initially, namely to a value that indicates the corresponding symbol is blank.

Since C-plane messages arrive ahead of corresponding U-plane messages, bitmap 304 can be completed prior to the arrival of the corresponding U-plane messages with significant time margins with respect to over the air (OTA) deadlines. Naturally this margin is a function of spacing between C-plane and U-plane messages for each symbol.

If a particular C-plane message is lost or dropped after reception for any reason (e.g., too early, too late, . . . ) bitmap 304, in the case where bits have been set to the first value, still represents a valid status for all symbols, even those with lost descriptions. This is due to the fact that those corresponding U-plane messages will be subsequently dropped anyway since there are no corresponding C-plane messages available to describe the required PRB allocations. Hence, there will be no transmission or reception of subcarriers over those symbols.

Example Methods

Figure 8:
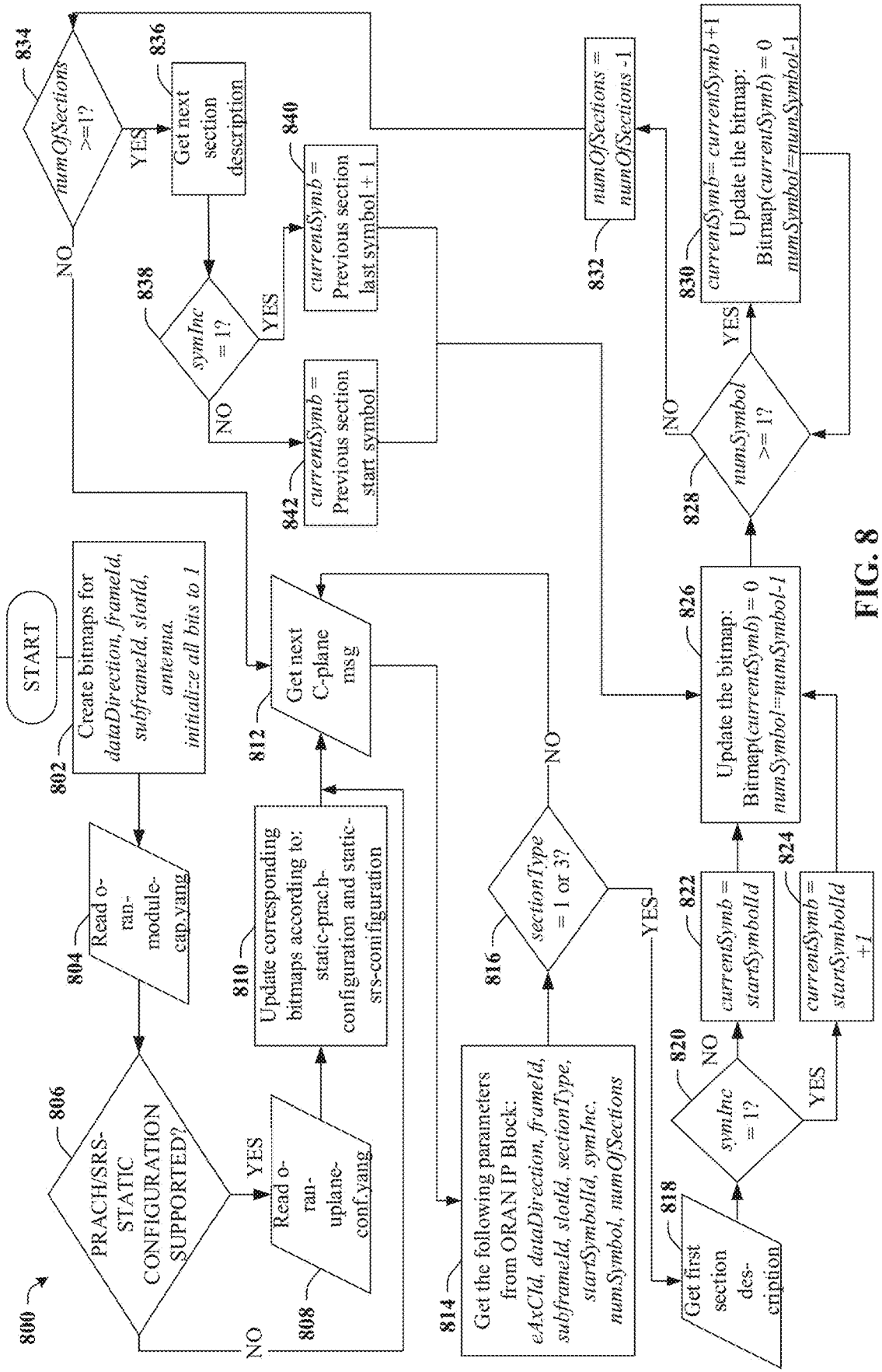
FIG. 8 illustrates an example method that can populate a bitmap to identify static and dynamic PRB allocation in accordance with example embodiments of this disclosure.
Figure 9:
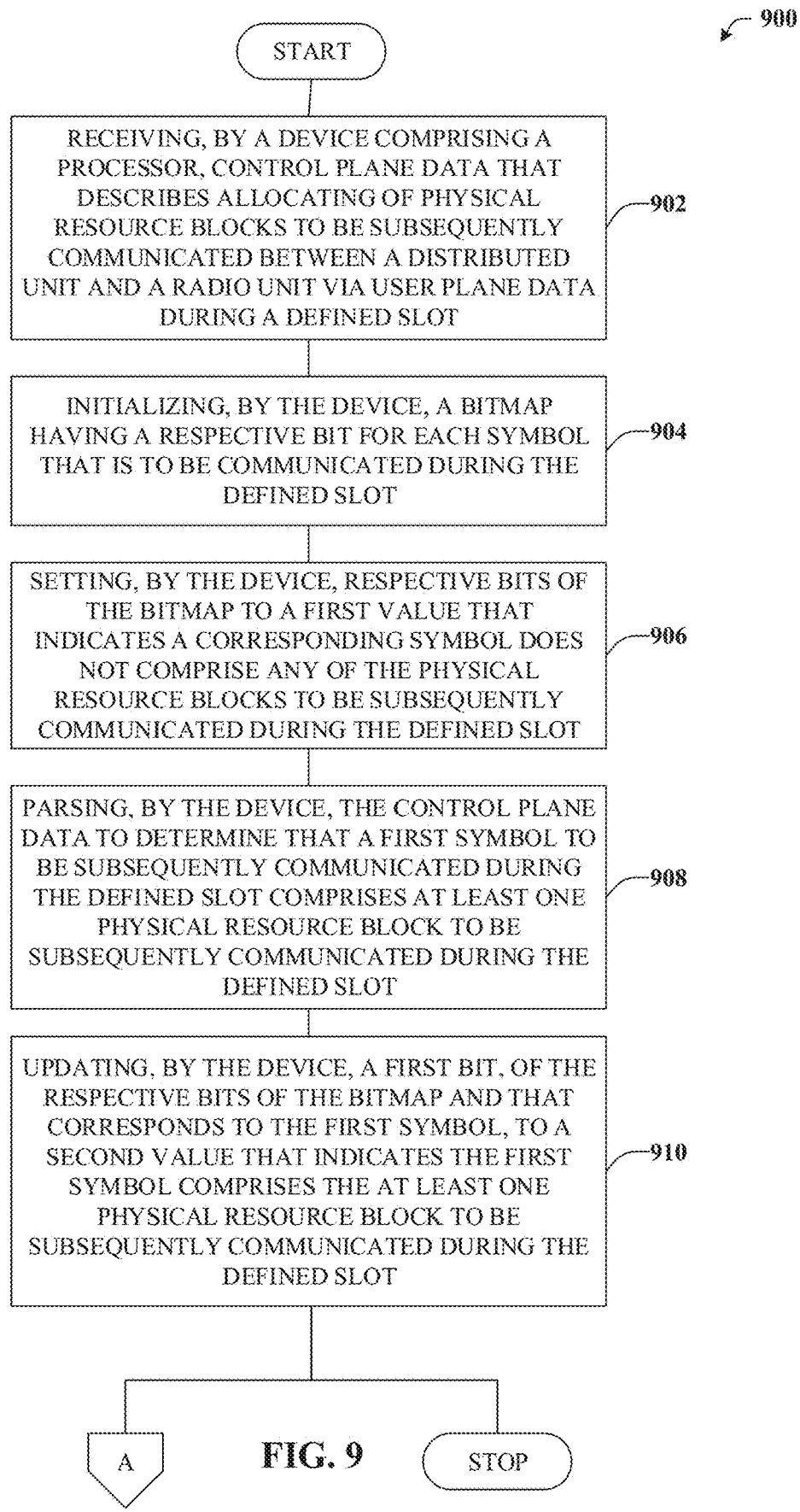
FIG. 9 illustrates an example method that can identify non-blank symbols that are scheduled or allocated in accordance with example embodiments of this disclosure.
Figure 10:
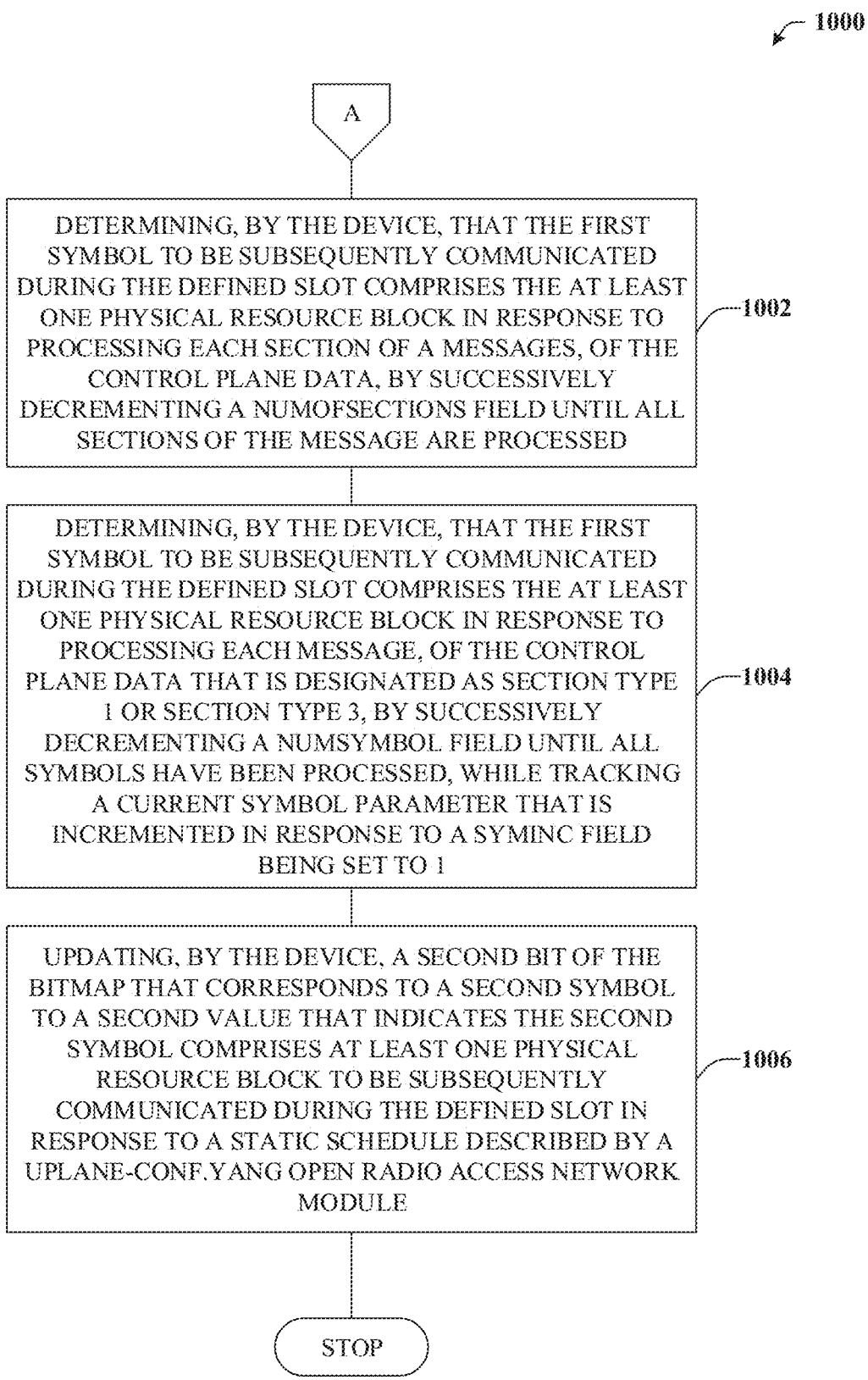
FIG. 10 illustrates an example method that can provide for additional elements in connection with identifying non-blank symbols that are scheduled or allocated in accordance with example embodiments of this disclosure.

FIGS. 8-10 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Turning now to FIG. 8, exemplary method 800 is depicted. Method 800 can populate a bitmap to identify static and dynamic PRB allocation in accordance with some example embodiments of this disclosure. At process block 802, a device comprising a processor can create or initialize a bitmap for a given data direction (e.g., uplink or downlink), a given antenna, and a given duration (e.g., frame, subframe, slot, . . . ). Initially, all bits of the bitmap can be set to "1". In this example, a bit value of "1" indicates that a given symbol does not allocate any PRB, and is therefore blank. In this example, a bit value of "0" indicates that the symbol allocates at least one PRB and is therefore not blank.

It is noted that there is a possibility that an O-RU may support U-plane operation without corresponding C-plane elements. Such is applicable, for instance, to channels with predictable scheduling that does not require changes of data-associated control information in real-time (e.g., within a duration separating U-plane messages from corresponding C-plane messages). Examples include PRACH and SRS, and mentioned previously.

If static allocation is enabled, then data-associated control information for selected eAxCs need not be transferred in C-plane messages, but rather the O-RU can receive static control information with resource allocation details that are configured via M-plane prior to eAxC activation. Support for this functionality is optional according to Open RAN specifications and the O-RU exposes its ability to support static PRACH and SRS configurations to the O-DU by indicating such in o-ran-module-cap.yang (e.g., a capability module in the Yang model). For example, PRACH-STATIC-CONFIGURATION-SUPPORTED and/or SRS-STATIC-CONFIGURATION-SUPPORTED, can respectively indicate O-RU capabilities in this regard. Such can be communicated to the O-DU as part of an initialization or startup process.

The parameters related to static configuration of PRACH and SRS can be set by NETCONF Client as part of carrier configuration (e.g., before carrier activation) in an o-ran-uplane-conf.yang module, which can be stored to O-RU memory such as in a radio software module. In this case, the O-RU receives RF signals and sends corresponding U-plane messages to the O-DU as if, for each configured PRACH and SRS pattern, C-plane messages received with fields populated using "static-prach-configuration" and "static-srs-configuration", respectively.

Blocks 804 to 810 relate to supporting static allocation detection, whereas the remainder of blocks relate to dynamic allocation detection. Therefore, in some embodiments, blocks 804 to 810 can be omitted or performed only once or only at certain times based on an event (e.g., update, powerup, . . . ) or a schedule. If static allocation elements are not implemented or not implemented in a particular instance, then method 800 can proceed to data block 812, focusing only on dynamic allocation detection. Thus, depending on the implementation, method 800 can proceed to data block 812 (not shown) or to data block 804, as depicted.

At data block 804, an o-ran-module-cap.yang can be read and the O-RU support for static configuration can thus be determined. At decision block 806, it is determined whether PRACH/SRS static configuration is supported. If not, method 800 proceeds to data block 812. If so, method 800 proceeds to data block 808 where o-ran-uplane-conf.yang module can be read. For example, if the O-RU supports the PRACH/SRS static configuration, then the related parameters (e.g., frameId, subframeId, slotId, startSymbolId, numSymbol, . . . ) can be extracted from o-ran-uplane-conf.yang Module by reading into the static-prach-configuration and static-SRS-configuration, respectively.

At process block 810, corresponding bitmaps for those slot/subframe/radio frame/antenna that have resources scheduled or allocated for static PRACH/SRS can be updated by setting the associated bit corresponding to a particular symbol to "0".

In effect, those symbols that have static allocations from the O-RU static configurations can be determined and the bitmap(s) can be updated accordingly since those scheduled PRBs for static PRACH/SRS allocations are no longer communicated through the C-plane messages. Once this initialization of the bitmaps completes, then processing incoming C-plane messages can begin and bits of the bitmap can be updated according to dynamic allocations from the O-DU thereafter.

At data block 812, the first (or next) C-plane message can be retrieved, which can begin a parsing procedure. At processing block 814, several parameters can be extracted from the ORAN IP block. Such parameters can include eAxCId, dataDirection, frameId, subframeId, slotId, sectionType, startSymbolId, symInc, numSymbol, numOfSections.

At decision block 816, the sectionType of the current message is examined. If the section type is not 1 or 3, then method 800 can return to data block 812 to retrieve the next C-plane message. Otherwise, if the section type is 1 or 3, the method 800 proceeds to data block 818 in which the first section description of the current message is read. Method 800 then proceeds to decision block 820.

If, in the first section description, a symbol increment field (e.g., symInc) is set to 0, then method 800 proceeds to process block 822, where the current symbol (e.g., currentSymb) is set to the start symbol identifier for the message (e.g., startSymbolID). Otherwise, if symInc is set to 1, then method 800 proceeds to process block 824, where currentSymb is set to startSymbolID+1. In either case, thereafter, method 800 proceeds to data block 826.

At process block 826, the bitmap can be updated accordingly and the number of symbols in the current section decremented. For example, Bitmap(currentSymb)=0; and numSymbol=numSymbol−1. At decision block 828, numSymbol can be compared to 1. If numSymbol is greater than or equal to 1, then method 800 can proceed to process block 830. Otherwise, if numSymbol is less than 1, then method 800 can proceed to process block 832.

At process block 830, the current symbol can be incremented, the bitmap updated accordingly, and the number of symbols decremented. For instance, currentSymb=currentSymb+1. Bitmap(currentSymb)=0. numSymbol=numSymbol−1. Thereafter, method 800 returns to decision block 828.

At process block 832, the number of section (e.g., numOfSections) is decremented and method 800 proceeds to decision block 834, where numOfSections is compared to 1. If numOfSections is less than 1, then method 800 returns to data block 812 to get the next C-plane message, if any. If numOfSections is greater than or equal to 1, then method 800 proceeds to process block 836 where the next section of the current C-plane message is retrieved.

At decision block 838, symInc is compared to 1. If symInc equals 1, then method 800 proceeds to process block 840. Otherwise, if symInc does not equal 1, then method 800 proceeds to process block 842. At process block 840, currentSymb is set to the previous section's last symbol+1. Otherwise, at process block 842, currentSymb is set to the previous section's start symbol. In either case, method 800 proceeds to process block 826 to update the bitmap and so forth.

Referring now to FIG. 9, exemplary method 900 is depicted. Method 900 can identify non-blank symbols that are scheduled or allocated in accordance with some example embodiments of this disclosure. While method 900 describes a complete method, in some embodiments, method 900 can include one or more elements of method 1000, as illustrated by insert A.

At reference numeral 902, a device comprising a processor can receive control plane data. The control plane data can describe allocation of physical resource blocks to be subsequently communicated between a distributed unit and a radio unit via user plane data during a defined slot.

At reference numeral 904, the device can initialize a bitmap having a respective bit for each symbol that is to be communicated during the defined slot. At reference 906, the device can set respective bits of the bitmap to a first value that indicates a corresponding symbol does not comprise any of the physical resource blocks to be subsequently communicated during the defined slot.

At reference numeral 908, the device can parse the control plane data to determine that a first symbol to be subsequently communicated during the defined slot comprises at least one physical resource block to be subsequently communicated during the defined slot. At reference numeral 910, the device can update a first bit of the bitmap. The first bit can correspond to the first symbol. The first bit can be updated to a second value that indicates the first symbol comprises the at least one physical resource block to be subsequently communicated during the defined slot. Method 900 can terminate or continue to insert A, which is further detailed in connection with FIG. 10.

Turning now to FIG. 10, exemplary method 1000 is depicted. Method 1000 can provide for additional elements in connection with identifying non-blank symbols that are scheduled or allocated in accordance with some example embodiments of this disclosure.

At reference numeral 1002, the device introduced at reference numeral 902 comprising a processor can determine that the first symbol to be subsequently communicated during the defined slot comprises the at least one physical resource block in response to processing each section of a messages, of the control plane data, by successively decrementing a numOfSections field until all sections of the message are processed.

At reference numeral 1004, the device can determine that the first symbol to be subsequently communicated during the defined slot comprises the at least one physical resource block in response to processing each message, of the control plane data that is designated as section type 1 or section type 3, by successively decrementing a numSymbol field until all symbols have been processed, while tracking a current symbol parameter that is incremented in response to a symInc field being set to 1.

At reference numeral 1006, the device can update a second bit of the bitmap that corresponds to a second symbol to a second value that indicates the second symbol comprises at least one physical resource block to be subsequently communicated during the defined slot in response to a static schedule described by a uplane-conf.yang open radio access network module.

Example Operating Environments

Figure 11:
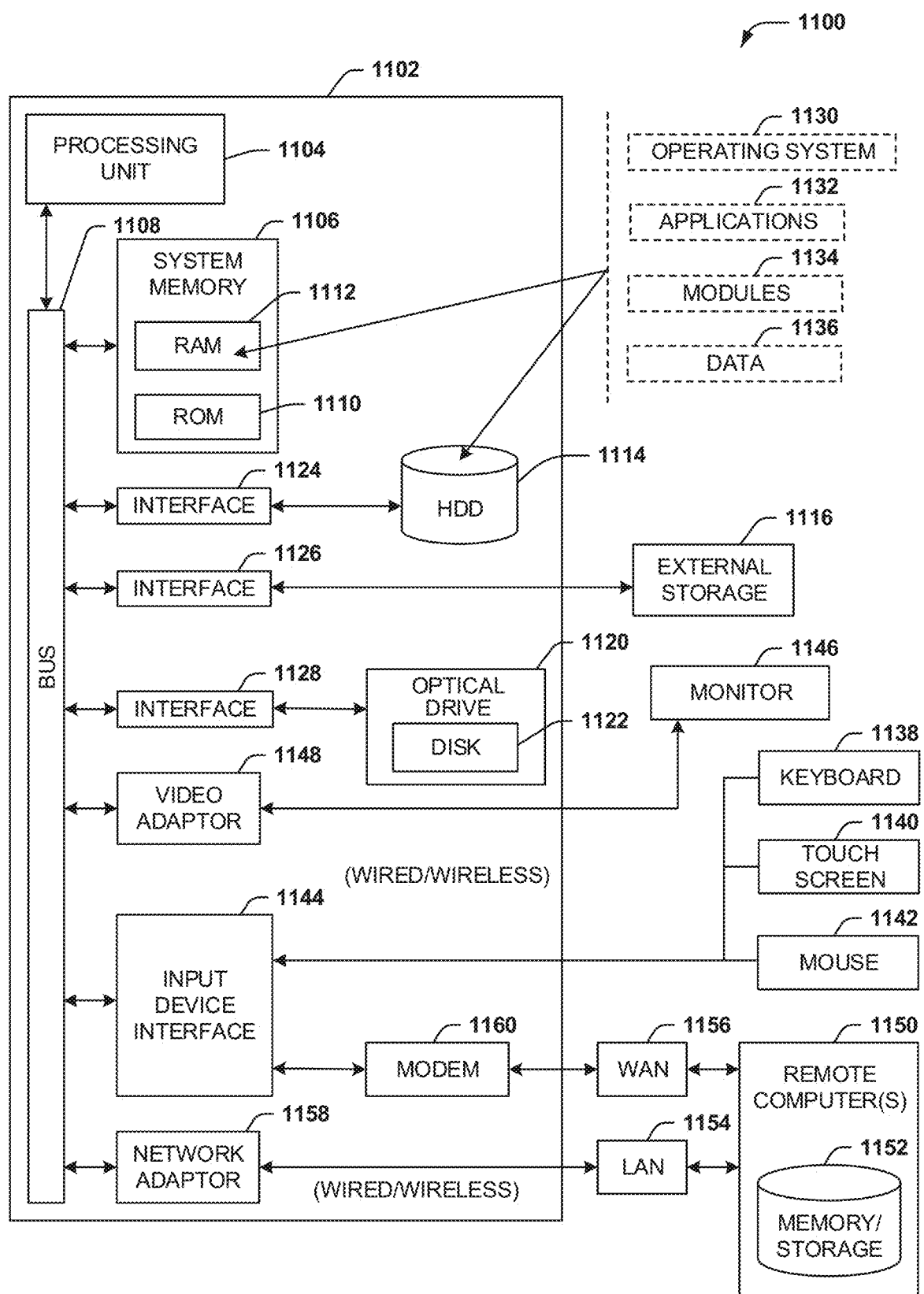
FIG. 11 illustrates an example block diagram of a computer operable to execute example embodiments of this disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown).

Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In this regard, when a processor executes instructions to perform "operations", this could include the processor performing the operations directly and/or facilitating, directing, or cooperating with another device or component to perform the operations.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated example embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips ...), optical disks (e.g., compact disk (CD), digital versatile disk (DVD) ...), smart cards, and flash memory devices (e.g., card, stick, key drive ...). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or" and it therefore interchangeable with the term "and/or". That is, unless specified otherwise, or clear from context, "X employs A or B" (or any like example) is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio unit, comprising:
   a processor; and
   a memory that stores executable instructions that, when executed by the processor, facilitate performance of operations, comprising:
   receiving a signal formatted according to an open radio access network, wherein the signal is received from a distributed unit of the open radio access network and comprises control plane data;
   initializing a bitmap comprising a number of bits corresponding to a number of symbols that are allocated or scheduled, via the open radio access network, for transport between the distributed unit and the radio unit, wherein a bit of the bitmap assigned to a first value of the bit indicates that an associated symbol of the number of symbols has no physical resource blocks allocated or scheduled, and wherein the bit assigned to a second value of the bit indicates that the associated symbol has at least one physical resource block allocated or scheduled;
   in response to examining the control plane data, identifying target messages comprising a first control plane message that is designated as a section type 1 message or a second control plan message that is designated as a section type 3 message;
   in response to a parsing procedure that parses the target messages, determining whether a given symbol of the number of symbols allocates or schedules a physical resource block and updating the bitmap accordingly; and
   instructing a device to power down during communication of any symbol, of the number of symbols, in which an associated bit of the bitmap is set to the first value.

2. The radio unit of claim 1, wherein the operations further comprise determining the number of bits of the bitmap based on a cyclic prefix being used by the open radio access network for communication between the distributed unit and the radio unit.

3. The radio unit of claim 2, wherein the operations further comprise determining the number of bits of the bitmap based on a duration associated with a multiplexing protocol applicable to the communication between the distributed unit and the radio unit.

4. The radio unit of claim 3, wherein the duration is equivalent to at least one of: a slot, a subframe, or a radio frame.

5. The radio unit of claim 3, wherein the multiplexing protocol is an orthogonal frequency division multiplexing protocol.

6. The radio unit of claim 1, wherein the bitmap is a first bitmap associated with downlink communication between the distributed unit and the radio unit, and wherein operations further comprise generating a second bitmap associated with uplink communication between the distributed unit and the radio unit.

7. The radio unit of claim 1, wherein the bitmap is a first bitmap associated with a first antenna of the radio unit, and wherein the operations further comprise generating a second bitmap associated with a second antenna of the radio unit.

8. The radio unit of claim 1, wherein the parsing procedure determines whether the given symbol allocates or schedules the physical resource block in response to processing each section of a message, of the target messages, by successively decrementing a number of sections field until all sections of the target message are processed.

9. The radio unit of claim 1, wherein the parsing procedure determines whether the given symbol allocates or schedules the physical resource block in response to processing each message, of the target messages, by successively decrementing a symbol number field until all symbols have been processed, while tracking a current symbol parameter that is incremented in response to an increment symbol field being set to 1.

10. The radio unit of claim 1, wherein the operations further comprise, in response to examining a cap.yang open radio access network module stored at the radio unit, determining that an optional static configuration is supported by the open radio access network to provide static allocation or static scheduling of physical resource blocks communicated via at least one of a physical random access channel or a sounding reference signal.

11. The radio unit of claim 10, wherein the operations further comprise, in response to extracting, from a uplane-conf.yang open radio access network module, a parameter from at least one member of a group comprising: a frame identifier parameter, a subframe identifier parameter, a slot identifier parameter, an identifier of a start of symbols parameter, or a number of symbols parameter, determining a timing associated with statically allocated symbols or statically scheduled symbols.

12. The radio unit of claim 11, updating the bitmap according to the timing associated with the statically allocated symbols or the statically scheduled symbols.

13. A non-transitory computer-readable medium comprising instructions that, in response to execution, cause a system comprising a processor to perform operations, comprising:

receiving, from a distributed unit of an open radio access network, control plane data representative of a scheduling of physical resource blocks to be subsequently communicated between the distributed unit and a radio unit via user plane data during a defined slot;

initializing a bitmap having a respective bit for each symbol, of symbols, that is to be communicated during the defined slot;

setting all bits of the bitmap to a first value that indicates a corresponding symbol does not comprise any of the physical resource blocks to be subsequently communicated during the defined slot;

parsing the control plane data to determine that a symbol, of the symbols, to be subsequently communicated during the defined slot comprises at least one physical resource block of the physical resource blocks to be subsequently communicated during the defined slot; and updating a first bit, of the bitmap that corresponds to the symbol, to a second value that indicates that the symbol comprises the at least one physical resource block of the physical resource blocks to be subsequently communicated during the defined slot.

14. The non-transitory computer-readable medium of claim 13, wherein the bitmap is a slot bitmap that is combined with a group of slot bitmaps, comprising the slot bitmap, to yield a subframe bitmap or a radio frame bitmap.

15. The non-transitory computer-readable medium of claim 13, wherein the parsing the control plane data comprises omitting messages unless designated as section type 1 or section type 3.

16. The non-transitory computer-readable medium of claim 13, wherein the operations further comprise instructing a device to power down during communication of any symbol in which a corresponding bit of the bitmap is set to the first value.

17. A method, comprising:

receiving, by a device comprising a processor, control plane data that describes allocating of physical resource blocks to be subsequently communicated between a distributed unit and a radio unit via user plane data during a defined slot;

initializing, by the device, a bitmap having a respective bit for each symbol that is to be communicated during the defined slot;

setting, by the device, respective bits of the bitmap to a first value that indicates a corresponding symbol does not comprise any of the physical resource blocks to be subsequently communicated during the defined slot;

parsing, by the device, the control plane data to determine that a first symbol to be subsequently communicated during the defined slot comprises at least one physical resource block to be subsequently communicated during the defined slot; and updating, by the device, a first bit, of the respective bits, of the bitmap and that corresponds to the first symbol, to a second value that indicates the first symbol comprises the at least one physical resource block to be subsequently communicated during the defined slot.

18. The method of claim 17, further comprising determining, by the device, that the first symbol to be subsequently communicated during the defined slot comprises the at least one physical resource block in response to processing each section of a messages, of the control plane data, by successively decrementing a numOfSections field until all sections of the message are processed.

19. The method of claim 17, further comprising determining, by the device, that the first symbol to be subsequently communicated during the defined slot comprises the at least one physical resource block in response to processing each message, of the control plane data that is designated as section type 1 or section type 3, by successively decrementing a numSymbol field until all symbols have been processed, while tracking a current symbol parameter that is incremented in response to a symInc field being set to 1.

20. The method of claim 17, further comprising updating, by the device, a second bit of the bitmap that corresponds to a second symbol to a second value that indicates the second symbol comprises at least one physical resource block to be subsequently communicated during the defined slot in response to a static schedule described by a uplane-conf.y-ang open radio access network module.

* * * * *